US006971319B2

(12) United States Patent
Bowden

(10) Patent No.: US 6,971,319 B2
(45) Date of Patent: Dec. 6, 2005

(54) FRICTION WEDGE WITH MECHANICAL BONDING MATRIX AUGMENTED COMPOSITION LINER MATERIAL

(75) Inventor: A. Gary Bowden, Laurinburg, NC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/692,204

(22) Filed: Oct. 23, 2003

(65) Prior Publication Data

US 2005/0087091 A1 Apr. 28, 2005

(51) Int. Cl.⁷ .............................................. B61F 5/00
(52) U.S. Cl. ................. 105/198.5; 105/224.1
(58) Field of Search ................. 105/198.2, 198.3, 105/198.5, 207, 198.4, 193, 220, 199.3, 199.4, 105/224.1, 225, 218.1

(56) References Cited

U.S. PATENT DOCUMENTS

| 31,008 | A |   | 1/1861 | Connel |   |
|---|---|---|---|---|---|
| 31,988 | A |   | 4/1861 | Lighthall |   |
| 34,903 | A |   | 4/1862 | Frost |   |
| 34,963 | A |   | 4/1862 | Hoyt |   |
| 2,458,210 | A |   | 1/1949 | Schlegel, Jr. |   |
| 3,554,618 | A | * | 1/1971 | Ditzler et al. | 384/42 |
| 3,559,589 | A |   | 2/1971 | Williams |   |
| 3,714,905 | A |   | 2/1973 | Barber |   |
| 3,851,595 | A |   | 12/1974 | Clasen |   |
| 3,901,163 | A |   | 8/1975 | Neumann |   |
| 3,926,127 | A |   | 12/1975 | Shima |   |
| 4,003,318 | A |   | 1/1977 | Bullock et al. |   |
| 4,084,514 | A |   | 4/1978 | Bullock |   |
| 4,103,623 | A |   | 8/1978 | Radwill |   |
| 4,109,585 | A |   | 8/1978 | Brose |   |
| 4,166,756 | A |   | 9/1979 | Geyer et al. |   |
| 4,167,907 | A | * | 9/1979 | Mulcahy et al. | 105/198.4 |
| 4,230,047 | A |   | 10/1980 | Wiebe |   |
| 4,244,298 | A |   | 1/1981 | Hawthorne et al. |   |
| 4,254,713 | A |   | 3/1981 | Clafford |   |
| 4,256,041 | A |   | 3/1981 | Kemper et al. |   |
| 4,274,340 | A |   | 6/1981 | Neumann et al. |   |
| 4,276,833 | A |   | 7/1981 | Bullock |   |
| 4,295,429 | A | * | 10/1981 | Wiebe | 105/198.4 |
| 4,426,934 | A |   | 1/1984 | Geyer |   |
| 4,491,075 | A |   | 1/1985 | Neumann |   |
| 4,574,708 | A |   | 3/1986 | Solomon |   |
| 4,760,799 | A |   | 8/1988 | Jackson et al. |   |
| 4,771,704 | A |   | 9/1988 | Gronlund et al. |   |
| 4,825,775 | A |   | 5/1989 | Stein et al. |   |
| 4,825,776 | A | * | 5/1989 | Spencer | 105/198.5 |

(Continued)

OTHER PUBLICATIONS

Standard Car Truck Company Information Sheet, Barber 925-SW Split Wedge Friction Casting, Jan. 2000.

Primary Examiner—Frantz F. Jules
(74) Attorney, Agent, or Firm—The Webb Law Firm

(57) ABSTRACT

A friction wedge assembly for use in a suspension system of railroad car trucks. The friction wedge assembly comprises a cast metal wedge having a bolster engaging surface, a truck side frame engaging surface and a surface disposed between the bolster engaging surface and the truck side frame engaging surface for engaging a spring that provides the load on the friction wedge assembly. There is a metal bonding matrix disposed on the truck side frame engaging surface of the wedge and a composition liner having a first side engageable with the metal bonding matrix and a radially opposed second side for engaging a metal wear liner on a side frame of such railroad car truck.

19 Claims, 4 Drawing Sheets

U.S. PATENT DOCUMENTS

| | | | |
|---|---|---|---|
| 4,915,031 A * | 4/1990 | Wiebe | 105/198.2 |
| 4,953,471 A | 9/1990 | Wronkiewicz et al. | |
| 4,974,521 A | 12/1990 | Eungard | |
| 4,986,192 A | 1/1991 | Wiebe | |
| 5,072,673 A | 12/1991 | Lienard | |
| 5,086,708 A | 2/1992 | McKeown, Jr. et al. | |
| 5,095,823 A | 3/1992 | McKeown, Jr. | |
| 5,176,083 A | 1/1993 | Bullock | |
| 5,239,932 A | 8/1993 | Weber | |
| 5,511,489 A | 4/1996 | Bullock | |
| 5,555,817 A | 9/1996 | Taillon et al. | |
| 5,555,818 A | 9/1996 | Bullock | |
| 5,753,055 A | 5/1998 | Liu | |
| 5,850,795 A | 12/1998 | Taillon | |
| 5,943,961 A | 8/1999 | Rudibaugh et al. | |
| 6,269,752 B1 | 8/2001 | Taillon | |
| 6,374,749 B1 * | 4/2002 | Duncan et al. | 105/198.5 |
| 6,425,334 B1 | 7/2002 | Wronkiewicz et al. | |
| 6,688,236 B2 | 2/2004 | Taillon | |
| 6,691,625 B2 | 2/2004 | Duncan | |
| 6,701,850 B2 * | 3/2004 | McCabe et al. | 105/198.5 |

* cited by examiner

FRICTION WEDGE WITH MECHANICAL BONDING MATRIX AUGMENTED COMPOSITION LINER MATERIAL

FIELD OF THE INVENTION

The present invention relates, in general, to a wedge shaped friction casting that serves as a shock absorber in the suspension of railroad cars and, more particularly, the present invention relates to a wedge casting with a metal bonded matrix on the face of the wedge casting for improved bonding integrity with the composite liner.

BACKGROUND OF THE INVENTION

The suspension of railroad trucks include a wedge shaped friction casting which serves as a shock absorber to dampen oscillations of the railway vehicle. The wedge is supported by a spring and is located between the bolster and the side frame. The sloped face of the wedge maintains contact with a mating face of the bolster while the vertical face of the wedge slides against a metal wear liner on the side frame. The spring pushes on the bottom face of the wedge thereby providing the load to force the wedge between the bolster and the side frame. The friction between the wedge and the side frame wear plate provides damping for the truck suspension.

Certain truck designs use a wedge with a composition friction liner bonded to the vertical face of the wedge. This composition liner provides the desired friction characteristics, particularly static friction similar to dynamic friction. One difficulty encountered with this design has been in obtaining a satisfactory bond of the composition liner to the cast metal wedge. Various methods of gluing a molded sheet of composition material and of bonding the material to the casting have been used. Under the severe operating and environmental conditions of railroad service, the composition liner sometimes separates from the cast metal wedge.

SUMMARY OF THE INVENTION

The present invention, therefore, provides a friction wedge assembly for use in a suspension system of railroad car trucks. The friction wedge assembly comprises a cast metal wedge having a bolster engaging surface, a truck side frame engaging surface and a surface disposed between the bolster engaging surface and the truck side frame engaging surface for engaging a means for providing a load on the friction wedge assembly. There is a metal bonding matrix disposed on the truck side frame engaging surface of the wedge and a composition liner having a first side engageable with the metal bonding matrix and a radially opposed second side for engaging a metal wear liner on a side frame of such railroad car truck.

OBJECTS OF THE INVENTION

It is, therefore, one of the primary objects of the present invention to provide a friction wedge assembly which includes a metal bonding matrix on the face of the wedge casting for improved bonding integrity with a composition liner.

Another object of the present invention is to provide a friction wedge assembly with a metal bonding matrix in which bonding with a composition liner is effected without the need for a backing plate.

Still another object of the present invention is to provide a friction wedge assembly with a metal bonding matrix wherein the bonding matrix is attached to the wedge assembly by welding.

Yet another object of the present invention is to provide a friction wedge assembly with a metal bonding matrix wherein the metal bonding matrix is incorporated into the wedge assembly in the casting design.

Another object of the present invention is to provide a friction wedge assembly with a metal bonding matrix wherein the bonding of the composition friction surface is improved.

Another object of the present invention is to provide a friction wedge assembly with a metal bonding matrix in which the friction wedge casting is cost effective.

Yet another object of the present invention is to provide a friction wedge assembly with a metal bonding matrix which will reduce maintenance.

Still another object of the present invention is to provide a friction wedge assembly with a metal bonding matrix which will be easily made interchangeable with existing wedge castings.

These and various other objects and advantages of this invention will become apparent after a full reading of the following detailed description, particularly, when read in conjunction with the attached drawings as described below and the appended claims.

Figure 1:
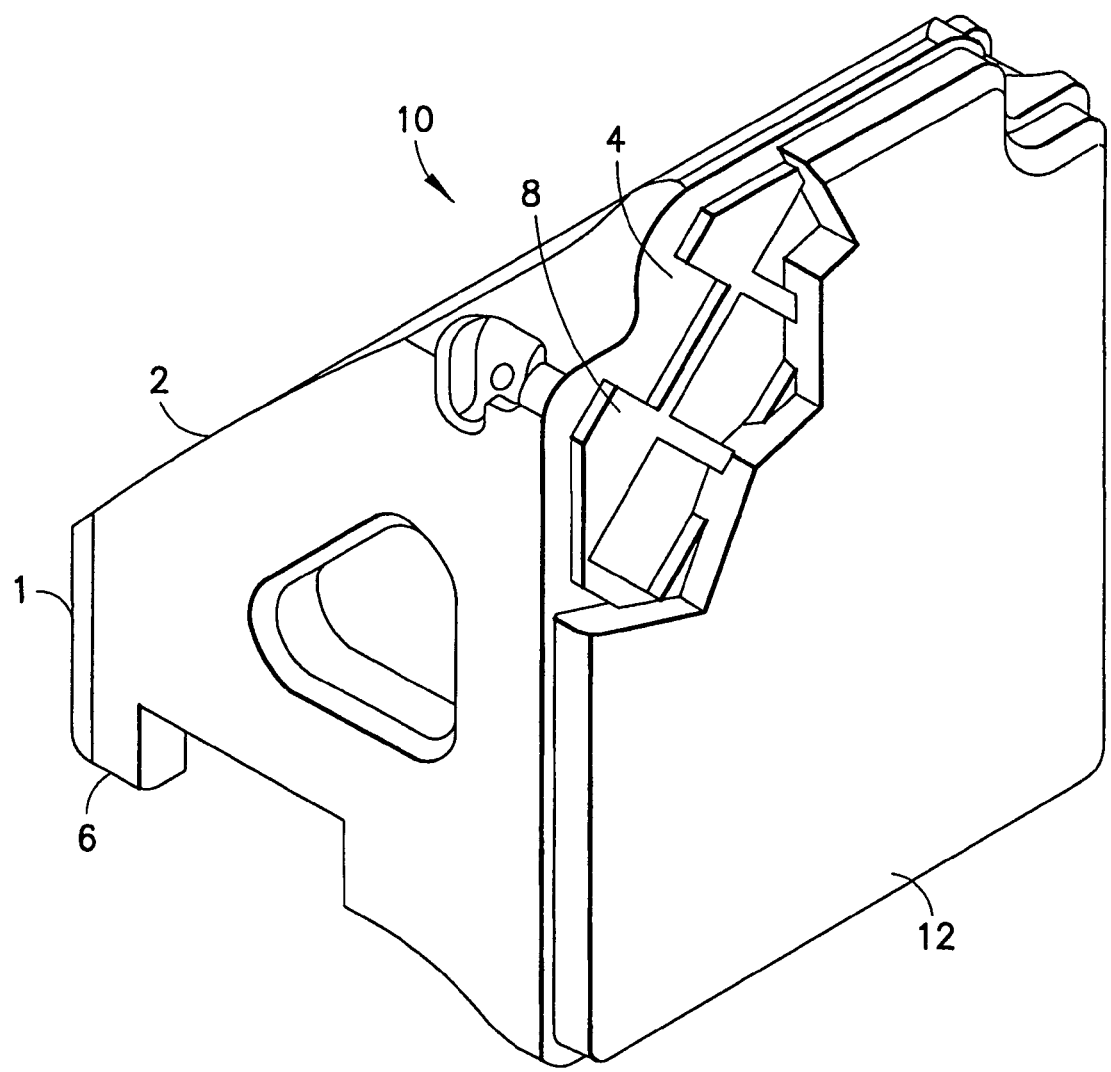
FIG. 1 is a sectional view of a friction wedge assembly with a composition wedge liner affixed to a metal bonding matrix according to an embodiment of the invention.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Figure 2:
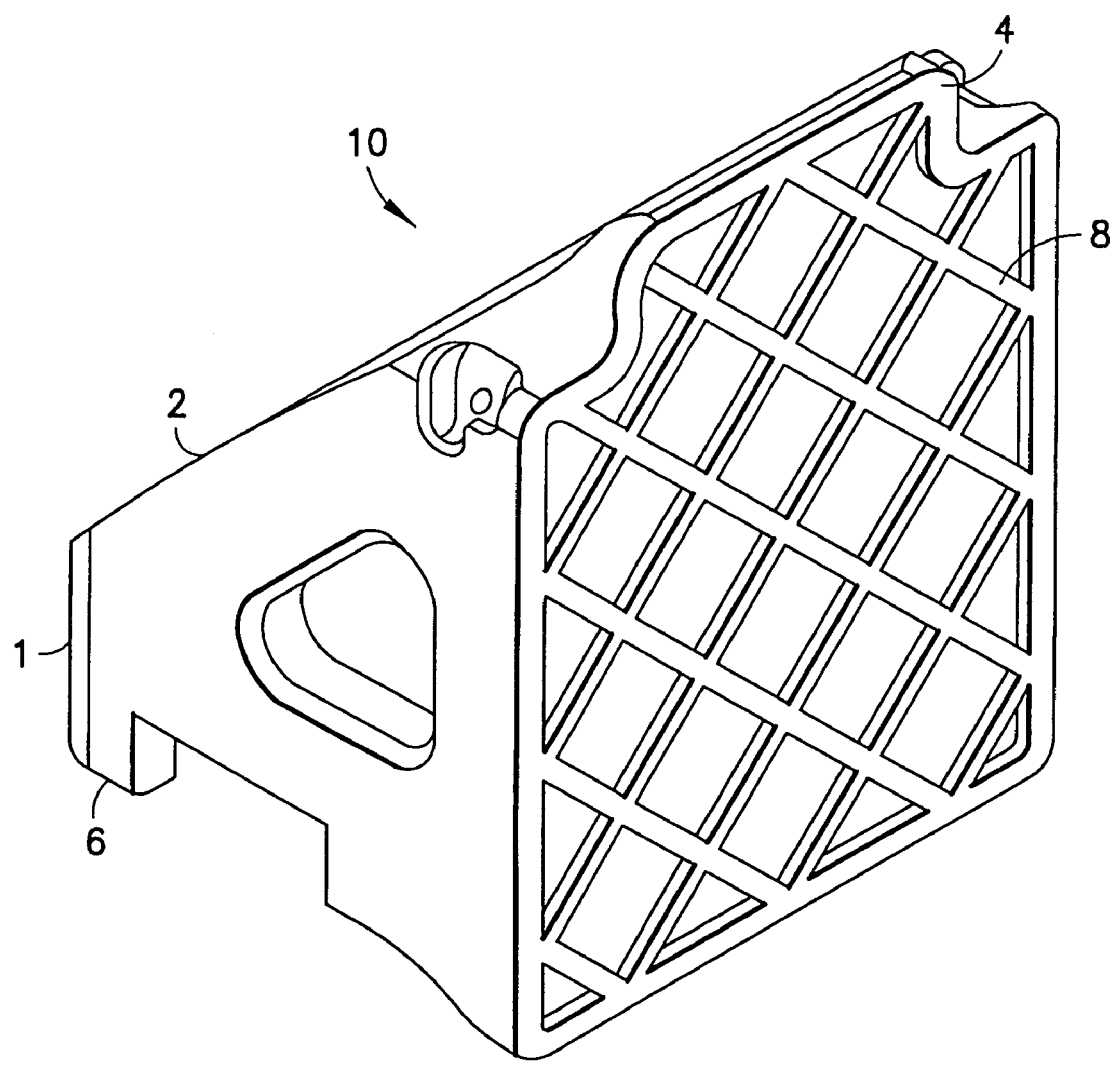
FIG. 2 is a sectional view of a friction wedge assembly showing a metal bonding matrix affixed to the wedge assembly.

Illustrated in FIGS. 1 and 2 is a friction wedge assembly, generally designated 10, for use in a suspension system of railroad car trucks. Such friction wedge assembly 10 includes a cast metal wedge 1 that has a bolster engaging surface 2 (sloped face), a truck side frame engaging surface 4 (substantially vertical face) and a surface 6 disposed between said bolster engaging surface and said a truck side frame engaging surface (bottom face). The bottom surface 6 is pushed by the spring (not shown) which provides the load to force the wedge assembly 10 between the bolster (not shown) and the side frame (not shown). Although it is presently preferred that such wedge 1 be a metal casting it is within the scope of the invention that such wedge 1 be of other material.

As is further evident in both FIGS. 1 and 2 there is also a bonding matrix 8 that is disposed on the truck side frame engaging surface 4. Although it is presently preferred that such bonding matrix 8 is a metal bonding matrix 8 it is within the scope of the invention that such bonding matrix 8 be of other material such as reinforced plastic.

The metal bonding matrix 8 is affixed to the truck side frame engaging surface 4 by either as a welding attachment or by being incorporated into the casting design of the wedge. With any wedge assemblies that are presently in operation the metal bonding matrix 8 would be attached by means of welding. Further as is evident in FIG. 1 there is also a composition liner 12. The composition liner 12 is bonded to the metal bonding matrix 8. Such composition liner is bonded to such metal bonding matrix 8 by chemical bonding means such as an adhesive.

The new bonding method, utilizing the bonding matrix 8, significantly increases the shear strength of the bond, compared to present bonding methods since there is provided both a mechanical bond and a chemical bond. Further, with the metal bonding matrix 8 there is no need for a backing stock material (backing plate) between the wedge casting 1 and the composition liner 12. With the present invention only one composition material is mixed, handled and molded. Another advantage of the use of the metal bonding matrix is in the elimination of a cracking tendency that is associated with the previous design using backing stock material. Due to the differences in physical properties of the backing stock material and the composition liner material, the backing stock can compress more than the friction material in certain operating conditions, causing a crack. The metal bonding matrix can be used with current wedge castings that are presently available without the necessity of any modification. This permits the upgrade of existing castings with the metal bonding matrix.

Figure 3:
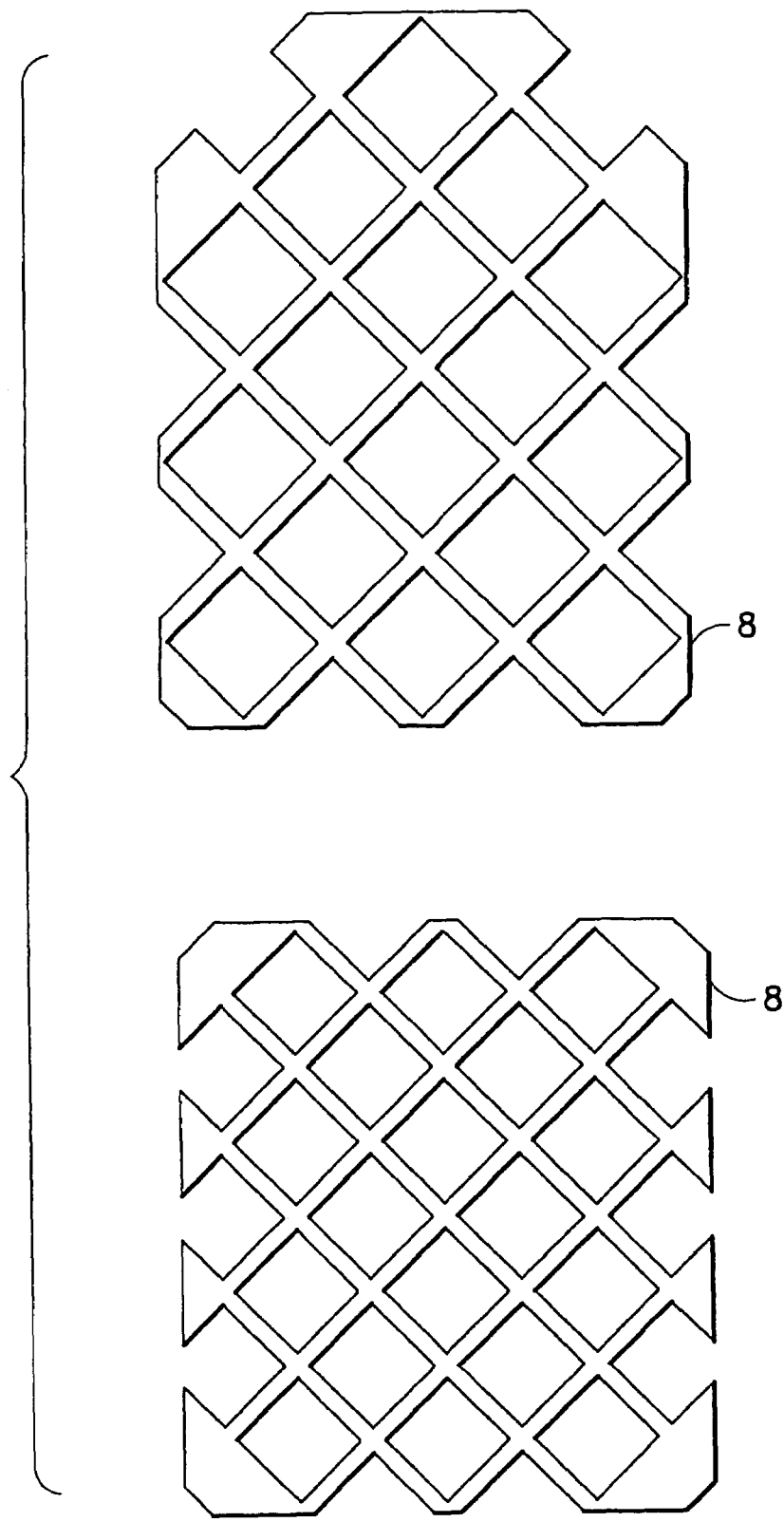
FIG. 3 is planar view of several patterns for a metal bonding matrix.
Figure 4:
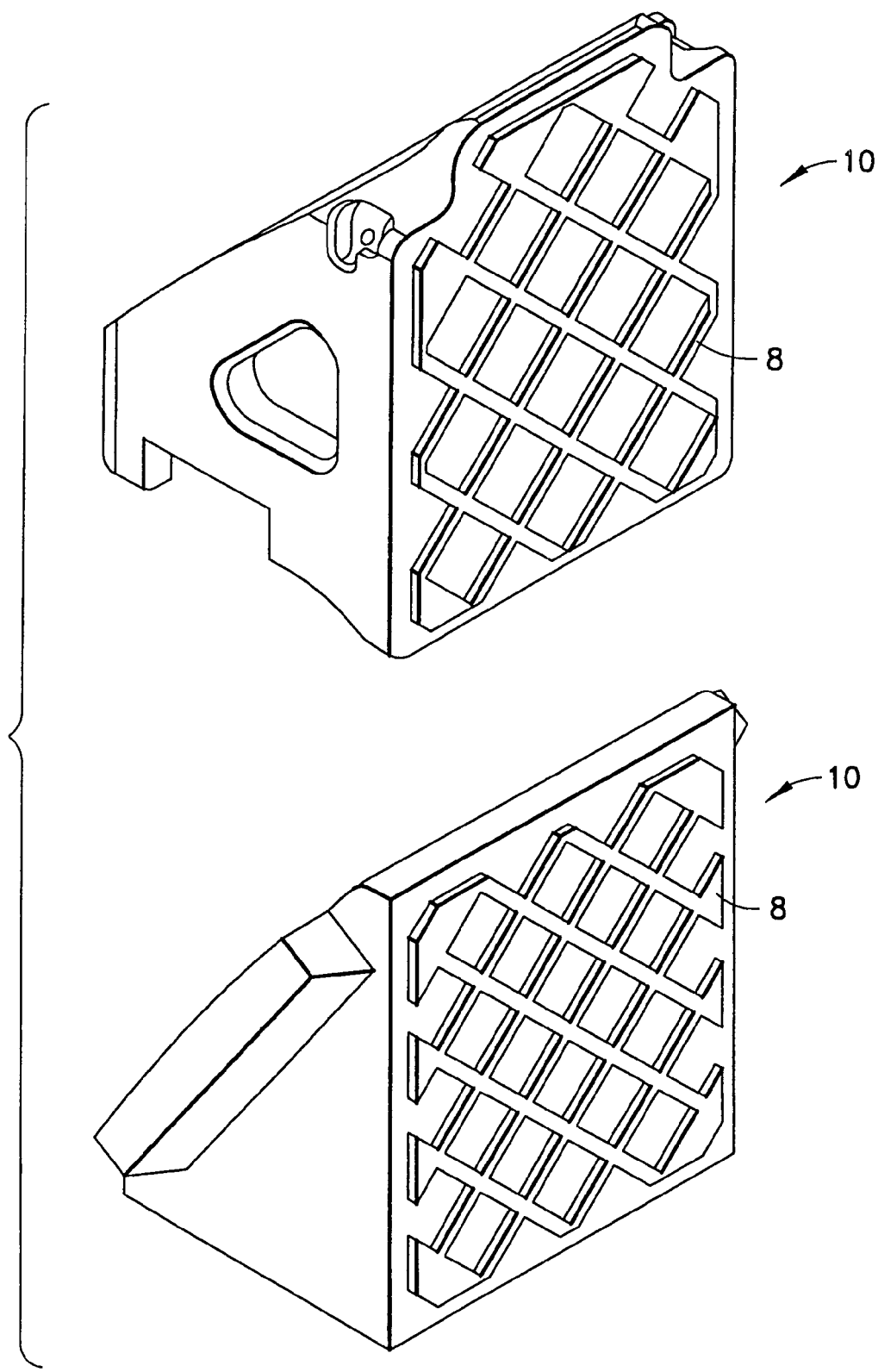
FIG. 4 shows several different wedge assemblies with a different metal bonding matrix attached to each.

The metal bonding matrix 8 incorporates a pattern of a plurality of cavities or voids, which provides a means of mechanical interlock between the molded composition material and the plate. The plurality of cavities has a predetermined configuration and such configuration or pattern is selected from a group consisting of diamond, rectangular, circular, oval and various combinations thereof. It is presently preferred that such cavities have a diamond shape. As is evident in FIGS. 3 and 4 there are different shaped patterns that can be used for the metal bonding matrix 8.

The metal bonding matrix has mechanical features which improve the bond with the composition liner 12 and can retain the composition liner 12 in place even in the case of a chemical bond deterioration. A flat configuration that minimizes protrusion of the bonding matrix into the composition material, thereby maximizing wearable life of the composition liner 12, still provides maximum height of mechanical interlock within the molded composition liner 12. Further there is a minimum ratio of raised material width to void or cavity width. This relationship assures maximum void area for shear strength and maximum vertical area for tensile grip on the composite friction material 12, with sufficient resistance to deformation of the bonding matrix when transverse loadings occur.

While both the presently preferred and a number of alternative embodiments of the present invention have been described in detail above it should be understood that various other adaptations and modifications of the present invention can be envisioned by those persons who are skilled in the relevant art of railway braking systems without departing from either the spirit of the invention or the scope of the appended claims.

I claim:

1. A friction wedge assembly for use in a suspension system of railroad car trucks, said friction wedge assembly comprising;
   (a) a wedge having a bolster engaging surface, a truck side frame engaging surface and a surface disposed between said bolster engaging surface and said truck side frame engaging surface for engaging a means disposed in such truck side frame for providing a load on said friction wedge assembly;
   (b) a bonding matrix having a plurality of cavities disposed on said truck side frame engaging surface of said wedge, said plurality of cavities having a predetermined configuration; and
   (c) a composition liner, a first side of said composition liner having a predetermined configuration engageable with said bonding matrix and a radially opposed second side of said composition liner for engaging a metal wear liner disposed on a side frame of a railroad car truck; and
   wherein said predetermined configuration of said first side of said composition liner is compatible with said predetermined configuration of said plurality of cavities on said bonding matrix.

2. A friction wedge assembly, according to claim 1, wherein said wedge is formed as one of a metal casting and a reinforced plastic.

3. A friction wedge assembly, according to claim 2, wherein said wedge is a metal casting.

4. A friction wedge assembly, according to claim 1, wherein said bonding matrix is a metal bonding matrix.

5. A friction wedge assembly, according to claim 4, wherein said metal bonding matrix is affixed to said truck side frame engaging surface by one of a welded attachment and incorporation into a casting design of said wedge.

6. A friction wedge assembly, according to claim 5, wherein said metal bonding matrix is affixed to said truck side frame engaging surface by said welded attachment.

7. A friction wedge assembly, according to claim 1, wherein said first side of said composition liner is bonded directly to said bonding matrix.

8. A friction wedge assembly, according to claim 7, wherein said first side of said composition liner is bonded directly to said bonding matrix by chemical bonding.

9. A friction wedge assembly, according to claim 8, wherein said chemical bonding is an adhesive.

10. A friction wedge assembly, according to claim 1, wherein said predetermined configuration of said plurality of cavities of said bonding matrix includes a pattern selected from a group consisting of diamond, rectangular, circular, oval and various combinations thereof.

11. A friction wedge assembly, according to claim 10, wherein said pattern of said plurality of cavities is rectangular.

12. A friction wedge assembly, according to claim 10, wherein said pattern of said plurality of cavities is diamond shaped.

13. A friction wedge assembly, according to claim 10, wherein said plurality of cavities on said bonding matrix provides a mechanical interlock between said composition liner and said wedge.

14. A friction wedge assembly, according to claim 1, wherein said truck side frame engaging surface of said wedge is substantially perpendicular to said surface disposed between said bolster engaging surface and said truck side frame engaging surface.

15. A composition liner for use with a friction wedge assembly, a first side of said composition liner having a predetermined configuration engageable with a corresponding configuration of a bonding matrix of the friction wedge assembly and a radially opposed second side of said composition liner for engaging a metal wear liner on a side frame of such railroad car truck; and wherein said predetermined configuration of said first side of said composition liner includes a plurality of projections, said plurality of projections having a predetermined shape.

16. A composition liner for use with a friction wedge assembly, according to claim 15, wherein said predetermined shape of said plurality of projections is selected from a group consisting of diamond, rectangular, circular, oval and various combinations thereof.

17. A friction wedge assembly for use in a suspension system of railroad car trucks, said friction wedge assembly comprising;
(a) a wedge having a bolster engaging surface, a truck side frame engaging surface and a surface disposed between said bolster engaging surface and said truck side frame engaging surface for engaging a means disposed in such truck side frame for providing a load on said friction wedge assembly;
(b) a bonding matrix having a plurality of cavities disposed on said truck side frame engaging surface of said wedge, said plurality of cavities having a predetermined configuration;
(c) a composition liner, a first side of said composition liner having a predetermined configuration engageable with said bonding matrix and a radially opposed second side of said composition liner for engaging a metal wear liner disposed on a side frame of a railroad car truck; and wherein said bonding matrix is a metal bonding matrix.

18. A friction wedge assembly, according to claim 17, wherein said metal bonding matrix is affixed to said truck side frame engaging surface by one of a welded attachment and incorporation into a casting design of said wedge.

19. A friction wedge assembly, according to claim 18, wherein said metal bonding matrix is affixed to said truck side frame engaging surface by said welded attachment.

* * * * *